March 11, 1952

C. A. MARIEN 2,589,106

PISTON PACKING RING

Filed April 11, 1949

2 SHEETS—SHEET 1

INVENTOR:
CHARLES A. MARIEN

BY *Harry E. Dennes*
ATTORNEY.

March 11, 1952 C. A. MARIEN 2,589,106
PISTON PACKING RING
Filed April 11, 1949 2 SHEETS—SHEET 2
FIG. 4.
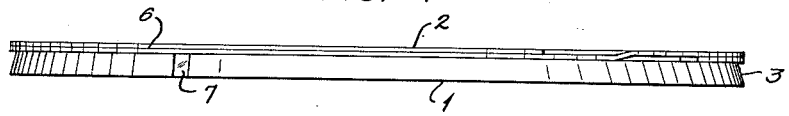
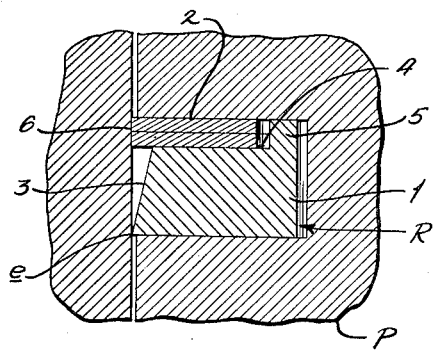
FIG. 5.
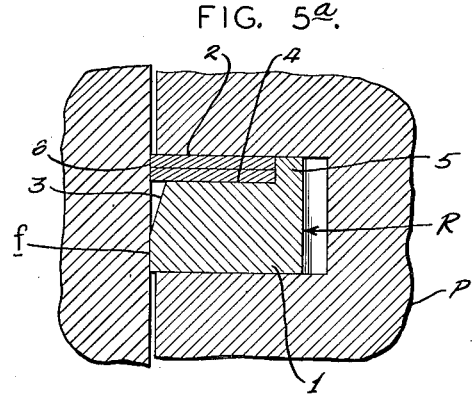
FIG. 5ᵃ.
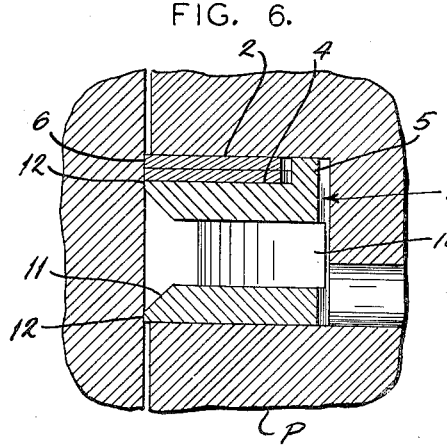
FIG. 6.
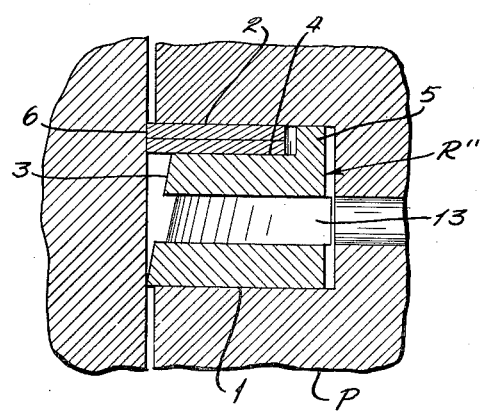
FIG. 7.
FIG. 8.
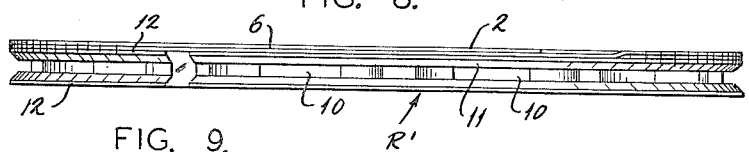
FIG. 9.
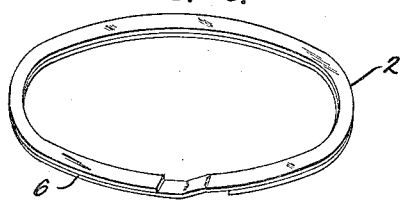
INVENTOR:
CHARLES A. MARIEN
BY Harry A. Bennes
ATTORNEY.

Patented Mar. 11, 1952

2,589,106

UNITED STATES PATENT OFFICE 2,589,106

PISTON PACKING RING

Charles A. Marien, St. Louis, Mo., assignor, by mesne assignments, to Ramsey Corporation, a corporation of Ohio Application April 11, 1949, Serial No. 86,650

3 Claims. (Cl. 309—44)

My invention has relation to improvements in piston packing rings and it consists in the novel features of construction more fully set forth in the specification and pointed out in the claims.

The invention is directed specifically to a compound ring, wherein there are two associated ring elements adapted for independent action but ultimately becoming coupled, or mated, so as to function as a unit. However, at all times the ring elements are mechanically independent.

Figure 1:
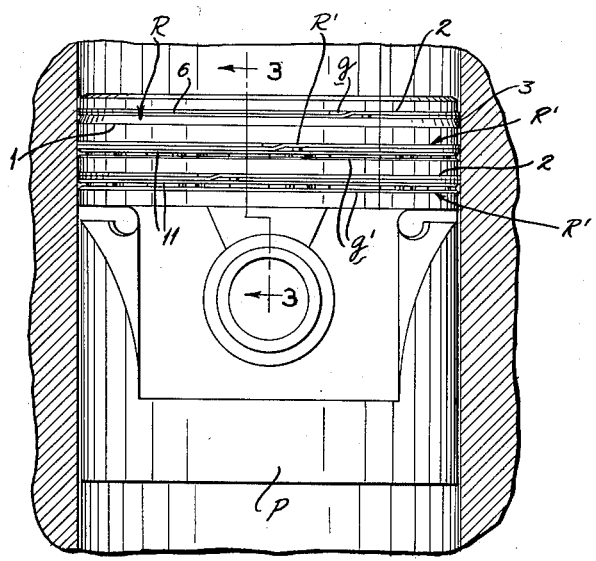
Figure 3:
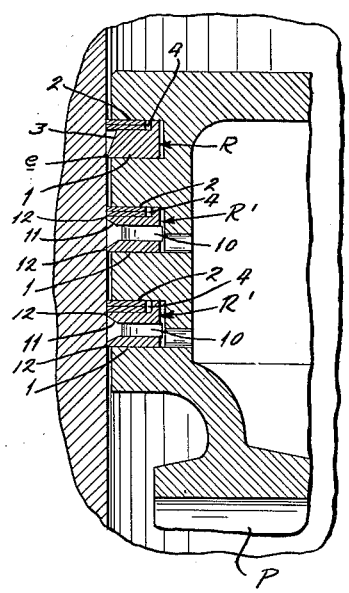
Figure 2:
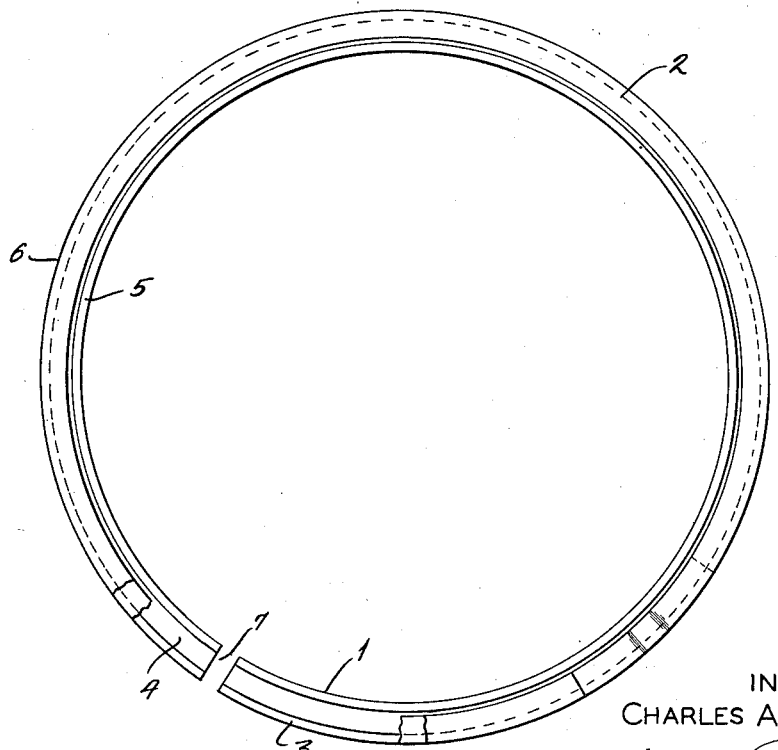

The principle object of the invention is to obtain the efficiency of two rings in a single ring groove; another object is to obtain rapid "break in" of the ring so that it will function with a high degree of efficiency from the moment it is placed in use. These objects as well as other advantages of the invention will be better apparent from a detailed description thereof, in connection with the accompanying drawings in which:

Figure 1 is a side elevation of a piston equipped with my improved rings; Figure 2 is a top plan of my improved ring combination; Figure 3 is an enlarged vertical cross-section taken on the line 3—3 of Figure 1; Figure 4 is a side elevation of my invention embodied in a compression ring; Figure 5 is an enlarged cross-section through a compression ring embodying my invention; Figure 5ª shows the same ring after it has been operated through the "break in" period; Figure 6 shows a cross-section through an oil-ring embodying my invention; Figure 7 shows a similar section through a modified form of oil-ring; Figure 8 shows a side elevation of the ring shown in Figure 6; and Figure 9 shows a perspective view of the helical element forming a part of the complete piston ring.

Referring to the drawings, and for the present, Figures 1 to 5ª inclusive and Figure 9, P represents a standard type of piston having grooves $g$, $g'$, $g'$ in which are disposed my improved piston rings R, R', R' respectively. Ring R is a compressing ring, and rings R', R' are oil-rings.

The compression ring R is made up of two members, or ring elements 1 and 2 in closely assembled relation but operatively independent of each other. The member 1 is a cast iron member of a face width to fit snugly in groove $g$ (proper working clearance, or tolerance, being provided according to established practice) and having a closing pressure of approximately 15 lbs. This is considered standard in the art and provides a high unit pressure against the cylinder wall on the hair line bearing edge $e$ of inclined face 3.

The upper surface of the ring member 1 is provided with channel 4 extending entirely around its circumference to form a seat for the steel helical ring member 2. It will be observed (Figure 5) that when the ring R is first assembled in groove $g$ there is no radial contact between the helical ring 2 and the inner margin 5 of the channel 4. Therefore, so far as radial pressure against the cylinder wall is concerned each ring member 1 and 2 act independently. However, because of the slight contact between the face of ring member 1 and the cylinder wall the edge $e$ of member 1 will wear very rapidly at first until a cylinder contacting face $f$ of some area is formed (Figure 5ª). At this time ring element 1 is completely "broke in" and has expanded so that its closing pressure has been reduced below the original 12 lbs. and the unit pressure against the cylinder wall is considerably reduced. Now that the ring member 1 has been worn in to fit the cylinder wall snugly the high unit pressure is no longer necessary, or desirable.

The helical ring element 2 is formed with a closing pressure of about 6 lbs. which remains practically constant as the wear on its working face 6 is negligible.

When ring member 1 is "worn in" as shown (Figure 5ª) the space between ring member 2 and channel margin (or shoulder) 5 has been taken up and said shoulder 5 comes into contact with ring 2 causing the members 1 and 2 to become coupled (or mated) whereupon they then operate more or less as a unit without, however, losing their independence of action. When the ring members have thus become coupled their respective closing pressures are approximately equal.

It will be observed that the gap 7 of ring member 1 is closed by the helical member 2 that overlies it (Figure 4).

In Figures 6 and 8 I show a modified form of the invention in which an oil-ring R' is composed of a vented member 10 in the face of which is a tapered channel 11 so as to provide narrow cylinder contacting surfaces 12, 12 to the cylinder wall. The ring is the same in principle as the main form.

A further modified form of ring R'' is shown in Figure 7. This ring differs from the main form only in the provision of the oil drainage slot 13.

Having described my invention, I claim:

1. A piston ring comprising two juxtaposed ring members, one of said members comprising a split annulus of cast iron and having a channel in its top surface, the other member comprising a helical ring element resting in said channel, and having clearance with the marginal flange thereof and each member acting independently of the other on the cylinder wall of the piston.

2. A piston ring comprising two juxtaposed ring members, one of said members comprising a split annulus of cast iron and having a channel in its top surface, the other member comprising a helical ring element resting in said channel, and having clearance with the marginal flange thereof the cast iron member having an initial closing pressure considerably in excess of that of the helical member, and said cast iron member having a narrow cylinder contacting edge adapted to wear in quickly whereby its closing pressure is rapidly reduced in use to approach that of the helical member.

3. A piston ring comprising two juxtaposed ring members, one of said members comprising a split annulus of cast iron and having a channel in its top surface, the other member comprising a helical ring element resting in said channel, and having clearance with the marginal flange thereof, said ring members having unequal radial tensions acting independently on the cylinder wall, and the cast iron ring member having a cylinder contacting face subject to rapid wear to bring the ring members into cooperative relation whereby they become mated with use and thereafter act as a unit.

CHARLES A. MARIEN.

REFERENCES CITED

The following references are of record in the file of this patent:

UNITED STATES PATENTS

| Number | Name | Date |
|---|---|---|
| 1,644,944 | Panyard | Oct. 11, 1927 |
| 2,128,372 | Marien | Aug. 30, 1938 |
| 2,148,764 | Maack | Feb. 28, 1939 |
| 2,202,802 | Mason | May 28, 1940 |
| 2,212,042 | Phillips | Aug. 20, 1940 |
| 2,252,199 | Phillips | Aug. 12, 1941 |

FOREIGN PATENTS

| Number | Country | Date |
|---|---|---|
| 281,545 | Great Britain | of 1927 |
| 650,241 | Germany | of 1937 |
| 703,467 | Germany | of 1941 |